(12) United States Patent
Nio et al.

(10) Patent No.: US 7,256,837 B2
(45) Date of Patent: Aug. 14, 2007

(54) BASEBAND VIDEO TRANSMISSION SYSTEM

(75) Inventors: Yutaka Nio, Osaka (JP); Taro Funamoto, Mino (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 453 days.

(21) Appl. No.: 10/362,627

(22) PCT Filed: Jun. 21, 2002

(86) PCT No.: PCT/JP02/06210

§ 371 (c)(1),
(2), (4) Date: Feb. 24, 2003

(87) PCT Pub. No.: WO03/001804

PCT Pub. Date: Jan. 3, 2003

(65) Prior Publication Data

US 2003/0234891 A1  Dec. 25, 2003

(30) Foreign Application Priority Data

Jun. 25, 2001  (JP) .............................. 2001-190963

(51) Int. Cl.
*H04N 7/08* (2006.01)
(52) U.S. Cl. ........................................ 348/473; 348/476
(58) Field of Classification Search ................ 348/478, 348/468, 473, 474, 461, 476; 370/493, 509; 375/222, 220
See application file for complete search history.

(56) References Cited

U.S. PATENT DOCUMENTS

| 6,954,491 B1* | 10/2005 | Kim et al. .................. 375/220 |
| 2002/0136241 A1* | 9/2002 | Pasqualino et al. ......... 370/493 |

FOREIGN PATENT DOCUMENTS

| JP | 9-168131 | 6/1997 |
| JP | 2000-036940 | 2/2000 |
| JP | 2000-163123 | 6/2000 |
| JP | 2001-069471 | 3/2001 |

OTHER PUBLICATIONS

DDWG (Digital Display Working Group), "Digital Visual Interface DVI" [online], Rev. 1.0, pp. 24-32, Apr. 1999 [retrieved on Oct. 24, 2001], Retrieved from the Internet: <URL:http://www.ddwg.org/register/index.php3>.

* cited by examiner

*Primary Examiner*—Michael H. Lee
(74) *Attorney, Agent, or Firm*—Wenderoth, Lind & Ponack, L.L.P.

(57) ABSTRACT

In a baseband video transmission system for transmission of a video signal at a baseband based on the DVI standard, a transmitting device multiplexes a data signal representing data other than video during at least one blanking period of component video signals of the video signal to generate a DVI signal. A receiving device receives the DVI signal, and extracts the data signal from the received DVI signal.

11 Claims, 9 Drawing Sheets

BASEBAND VIDEO TRANSMISSION SYSTEM

TECHNICAL FIELD

The present invention relates to signal transmission systems complying with the DVI (Digital Visual Interface) standard and enabling transmission of an audio signal and a control signal together with a video signal. In more detail, the present invention relates to a control signal for managing such signal transmission and a baseband video transmission system.

BACKGROUND ART

FIG. 11 illustrates the configuration of a conventional signal transmission system based on the DVI standard. In FIG. 11, reference numerals 2601, 2602, and 2603 denote transition minimized differential signaling (hereinafter abbreviated as "TMDS") encoders/serializers provided at a transmitting side. Also, reference numerals 2604, 2605, and 2606 denote TMDS decoders/recovery units provided at a receiving side.

As illustrated in FIG. 11, in a conventional signal transmission system STSc, red, green, and blue component signals SR, SG, and SB are supplied to the TMDS encoders/serializers 2601, 2602, and 2603, respectively. The TMDS encoders/serializers 2601, 2602, and 2603 respectively TMDS-encode and then serialize the supplied component signals SR, SG, and SB, and send the resultant serial signals to a transmission path TP. Then, at the receiving side, the received serialized signals are TMDS-decoded by the TMDS decoders/recovery units 2604, 2605, and 2606 for recovering the component signals SR, SG, and SB.

A data enable signal DE is a signal that is indicative of a period during which any of the component signals SR, SG, and SB exists and becomes HIGH when active. For example, the period during which the data enable signal DE is LOW coincides with a horizontal synchronizing signal period or a vertical synchronizing signal period. Also, four types of control signals CTL0, CTL1, CTL2, and CTL3 are reserved, but are not used in the present DVI standard. Specifically, the levels of the control signals CTL0, CTL1, CTL2, and CTL3 are always 0.

At the transmitting side, the TMDS encoders/serializers 2601, 2602, and 2603 each convert the video signal (SR, SG, and SB) supplied by 8 bits into a signal of 10 bits, and then serialize the resultant signal for output to the transmission path TP. An object of 8-bit/10-bit conversion is to make data in an appropriate form that is suitable for high-speed transmission by reducing the number of changing points in the data. Also, the TMDS encoders/serializers 2601, 2602, and 2603 respectively convert the 2-bit control signals CTL0, CTL1, CTL2, and CTL3 into a 10-bit signal for output to the transmission path TP.

The TMDS encoders/serializers 2601, 2602, and 2603 each encode and serialize the data enable signal DE for output as serial data to the transmission path TP.

The TMDS decoders/recovery units 2604, 2605 and 2606 at the receiving side decode the 10-bit serial data received from the transmission path TP into the 8-bit red, green, and blue component signals SR, SG, and SB, the data enable signal DE, and the 2-bit control signals CTL0, CTL1, CTL2, and CTL3 for expansion.

However, the DVI standard is directed only to video signal transmission. Therefore, the conventional signal transmission system is not intended to provide a comfortable user interface that enables transmission of information, such as closed-captions or teletext, caption broadcasting, host control information and connection information, etc.

Therefore, an object of the present invention is to provide a signal transmission system that complies with the DVI standard and enables the transmission of closed-captions or teletext together with a video signal, and also transmits a control signal for controlling a host.

SUMMARY OF THE INVENTION

To achieve the above object, a baseband video transmission system according to the present invention for transmission of a video signal at a baseband based on the DVI standard includes a transmitting device that multiplexes a data signal representing data other than video during at least one blanking period of component video signals of the video signal to generate a DVI signal, and a receiving device that receives the DVI signal, and extracts the data signal from the received DVI signal.

DETAILED DESCRIPTION OF THE INVENTION

The present invention is described in more detail in accordance with the attached drawings.

First Embodiment

With reference to FIGS. 1, 2, 3, and 4, a baseband video transmission system according to a first embodiment of the present invention is described.

Figure 1:
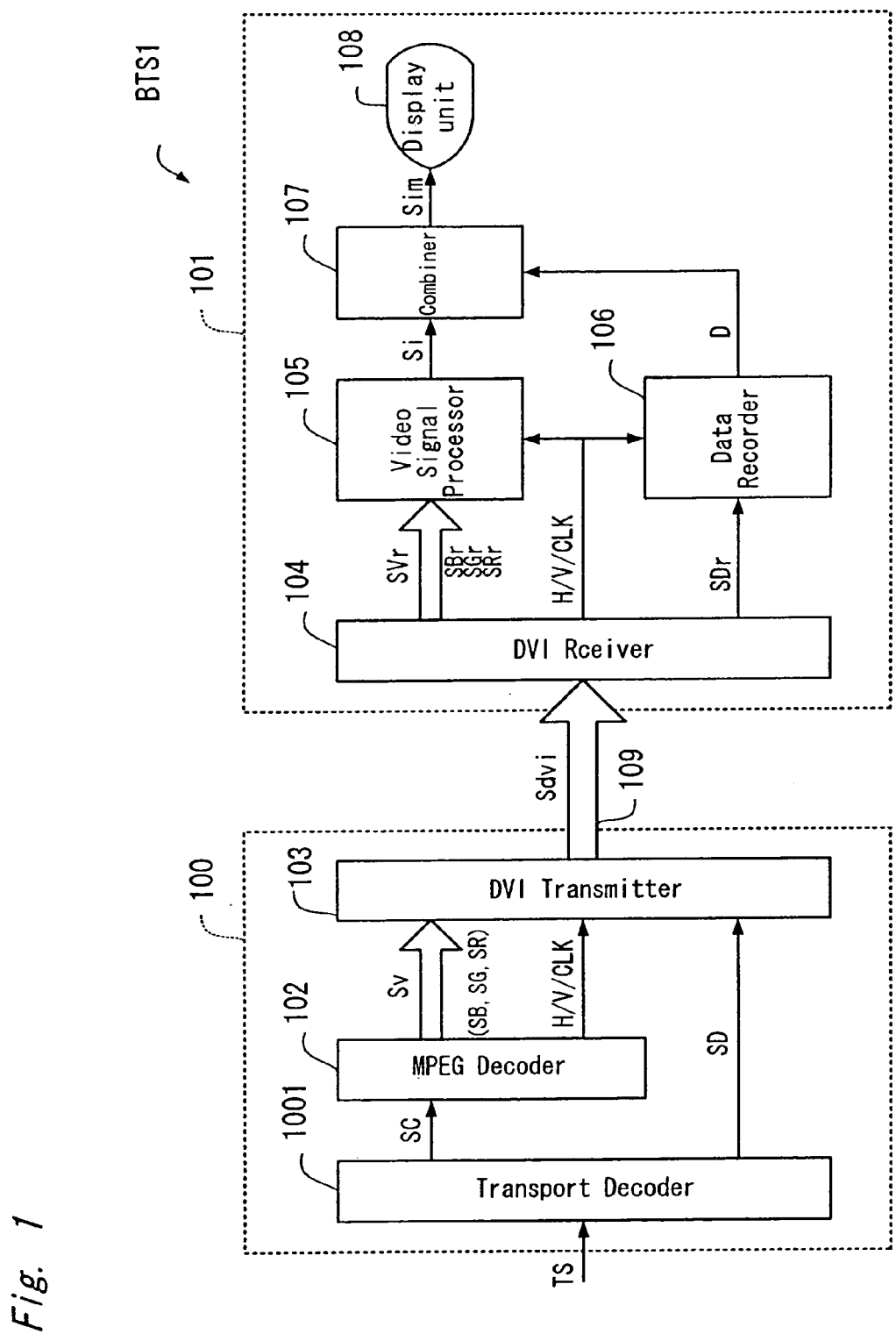
FIG. 1 is a block diagram illustrating the configuration of a baseband video transmission system according to a first embodiment of the present invention.

As illustrated in FIG. 1, a baseband video transmission system BTS1 according to the present embodiment is broadly divided into a video device 100 at a transmitting side, a display 101 at a receiving side, and a DVI cable 109 for connecting therebetween.

The video device 100 includes a transport decoder 1001, an MPEG decoder 102, and a DVI transmitter 103. The display 101 includes a DVI receiver 104, a video signal processor 105, a data decoder 106, a combiner 107, and a display unit 108.

In the video device 100, the transport decoder 1001 decodes a transport stream TS supplied by an external content data source (not shown) to generate MPEG content data SC and a data signal SD. Note that the data signal SD includes information other than contents, such as closed captions or teletext.

The MPEG decoder 102 decodes the MPEG content data SC that is generated and supplied by the transport decoder 1001 to extract therefrom a video signal SV and synchronizing signals H/V/CLK. Note that the synchronizing signals H/V/CLK include a horizontal synchronizing signal H-Sync, a vertical synchronizing signal V-Sync, and a system clock CLK of the video device 100.

The DVI transmitter 103 performs, based on the DVI standard, a process of multiplexing the video signal SV, the synchronizing signals H/V/CLK extracted by the MPEG decoder 102 and the data signal SD outputted from the transport decoder 1001 to generate a DVI signal Sdvi. The generated DVI signal Sdvi is transmitted via the DVI cable 109 to the display 101.

On the other hand, in the display 101, the DVI receiver 104 demultiplexes the DVI signal Sdvi supplied via the DVI cable 109 to reproduce the video signal SV, the synchronizing signals H/V/CLK, and the data signal SD. The data decoder 106 decodes the data signal SD based on the synchronizing signals H/V/CLK outputted from the DVI receiver 104 to reproduce display data D such as closed captions or teletext.

Similarly, based on the synchronizing signals H/V/C, the video signal processor 105 generates a content video signal Si based on the video signal SV supplied by the DVI receiver 104.

The combiner 107 combines the content video signal Si supplied by the video signal processor 105 and the display data D supplied by the data decoder 106 together to generate a display image signal Sim. Based on the display image signal Sim, the display unit 108 presents video having the display data multiplexed on the contents.

For convenience in description, the video signal SV and data signal SD reproduced by the DVI receiver 104 are hereinafter called a reproduced video signal SVr and a reproduced data signal SDr, respectively, for distinguishing between the original video signal SV and data signal SD to be processed in the video device 100.

Figure 2:
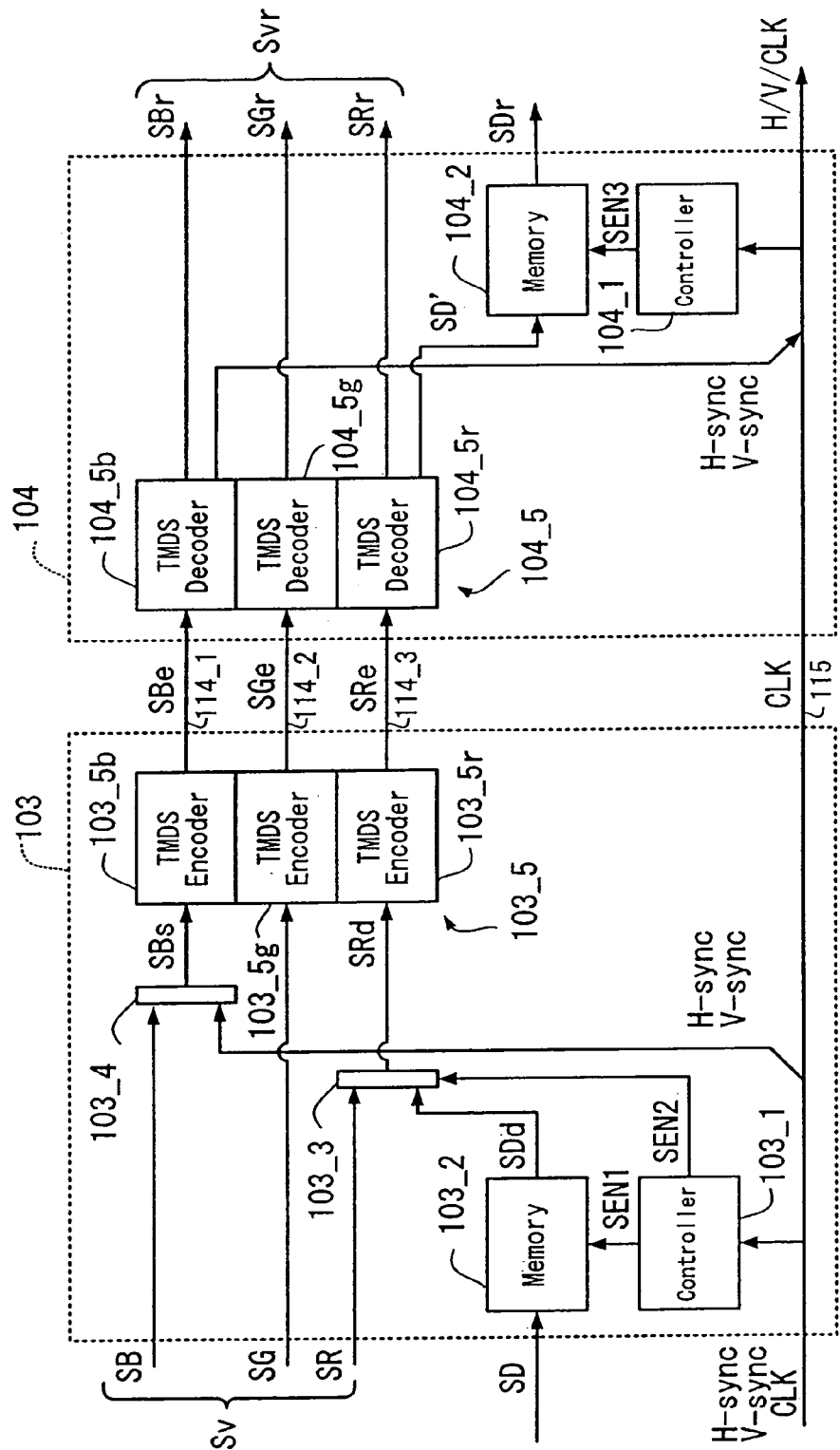
FIG. 2 is a block diagram illustrating the detailed structure of a video device and a display illustrated in FIG. 1.

With reference to FIG. 2, the DVI transmitter 103 and the DVI receiver 104 are described next in more detail. The DVI transmitter 103 and the DVI receiver 104 are connected to each other via the DVI cable 109, which is broadly divided into a data line 114 including three signal lines 114_1, 114_2, and 114_3, and a single clock line 115.

The DVI transmitter 103 includes a controller 103_1, a memory 103_2, a multiplexer 103_3, a multiplexer 103_4, and a TMDS encoder group 103_5. The TMDS encoder group 103_5 includes three TMDS encoders 103_5b, 103_5g, and 103_5r.

The multiplexer 103_3 and the multiplexer 103_4 each have two input ports and one output port for multiplexing two signals supplied to the input ports to output one signal from the output port. Note that one of the input ports of the multiplexer 103_3 is supplied with a red component signal SR (hereinafter abbreviated as "red signal SR") that composes the video signal SV output from the MPEG decoder 102. The multiplexer 103_4 is supplied with a blue component signal SB (hereinafter abbreviated as "blue signal SB") that composes the video signal SV output from the MPEG decoder 102.

Based on the synchronizing signals H/V/CLK supplied by the MPEG decoder 102, the controller 103_1 generates a first control signal SEN1 for controlling reading to and from the memory 103_2, and a second control signal SEN2 for controlling the operation of the multiplexer 103_3.

Based on the first control signal SEN1, the memory 103_2 stores, at predetermined timing, the data signal SD output from the transport decoder 1001, and outputs the same to the other one of the input ports of the multiplexer 103_3.

Based on the second control signal SEN2, the multiplexer 103_3 multiplexes the red signal SR and the data signal SD to generate a multiplexed red signal SRd, and also outputs the multiplexed red signal SRd to the TMDS encoder 103_5r.

The other one of the input ports of the multiplexer 103_4 is supplied with the horizontal synchronizing signal H-Sync and the vertical synchronizing signal V-Sync of the synchronizing signals H/V/CLK outputted from the MPEG decoder 102. Then, the multiplexer 103_4 multiplexes the blue signal SB and the horizontal and vertical synchronizing signals H-Sync and V-Sync to generate a multiplexed blue signal SBs for output to the TMDS encoder 103_5b.

Note that the green component signal SG (hereinafter abbreviated as "green signal SG") that composes the video signal SV outputted from the MPEG decoder 102 is output directly to the TMDS encoder 103_5g.

In the TMDS encoder group 103_5, the TMDS encoder 103_5b encodes the multiplexed blue signal SBs to generate a blue DVI signal SBe. The TMDS encoder 103_5g encodes the green signal SG to generate a green DVI signal SGe. The TMDS encoder 103_5r encodes the multiplexed red signal SRd to generate a red DVI signal SRe. Then, from the TMDS encoder group 103_5, the blue DVI signal SBe, the green DVI signal SGe, and the red DVI signal SRe are output as a DVI video signal SVe (not shown) to the data line 114. The system clock CLK is output to the clock line 115. The DVI video signals SVe and the system clock CLK form the DVI signal Sdvi.

The DVI receiver 104 includes a controller 104_1, a memory 104_2, and a TMDS decoder group 104_5. The TMDS decoder group 104_5 includes three TMDS decoders 104_5b, 104_5g, and 104_5r.

The TMDS decoder 104_5b is supplied, via the signal line 114_1, with the blue DVI signal SBe that composes the DVI signal Sdvi and is output from the TMDS encoder 103_5b of the DVI transmitter 103. The TMDS decoder 104_5b decodes the blue DVI signal SBe to reproduce the blue signal SB and the horizontal and vertical synchronizing signals H-Sync and V-Sync. The reproduced blue signal SB (hereinafter abbreviated as "reproduced blue signal SBr") is output to the video signal processor 105 as part of the video signal SV. The horizontal and vertical synchronizing signals H-Sync and V-Sync are multiplexed with the system clock CLK supplied by the DVI transmitter 103 for reproduction of the synchronizing signals H/V/CLK.

The TMDS decoder 104_5g is supplied, via the signal line 114_2, with the green DVI signal SGe outputted from the TMDS encoder 103_5g. The TMDS decoder 104_5g decodes the green DVI signal SGe to reproduce the green signal SG. Then, the reproduced green signal (hereinafter referred to as "reproduced green signal SGr") is output to the video signal processor 105 as part of the video signal SV.

The TMDS decoder 104_5r is supplied, via the signal line 114_3, with the read DVI signal SRe outputted from the TMDS encoder 103_5r. The TMDS decoder 104_5r decodes the red DVI signal SRe to reproduce the red signal SR and the data signal SD. The reproduced red signal SR (hereinafter abbreviated as "reproduced red signal SRr") is output to the video signal processor 105 as part of the video signal SV. Note that the reproduced blue signal SBr, the reproduced green signal SGr, and the reproduced data signal SDr are hereinafter collectively called a reproduced video signal SVr.

On the other hand, the data signal SD reproduced by the TMDS decoder 104_5r (hereinafter referred to as "provisional reproduced data signal SD'") is supplied to the memory 104_2.

The controller 104_1 generates a third control signal SEN3 for controlling reading to and from the memory 104_2. This generation is based on the synchronizing signal H/V/CLK reproduced by multiplexing the system clock CLK supplied by the DVI transmitter 103 with the horizontal and vertical synchronizing signals H-Sync and V-Sync supplied by the TMDS decoder 104_5b.

The memory 104_2 stores the provisional reproduced data SD' at predetermined timing based on the third control signal SEN3, and also outputs the same as the reproduced data signal SDr to the data decoder 106.

Figure 3:
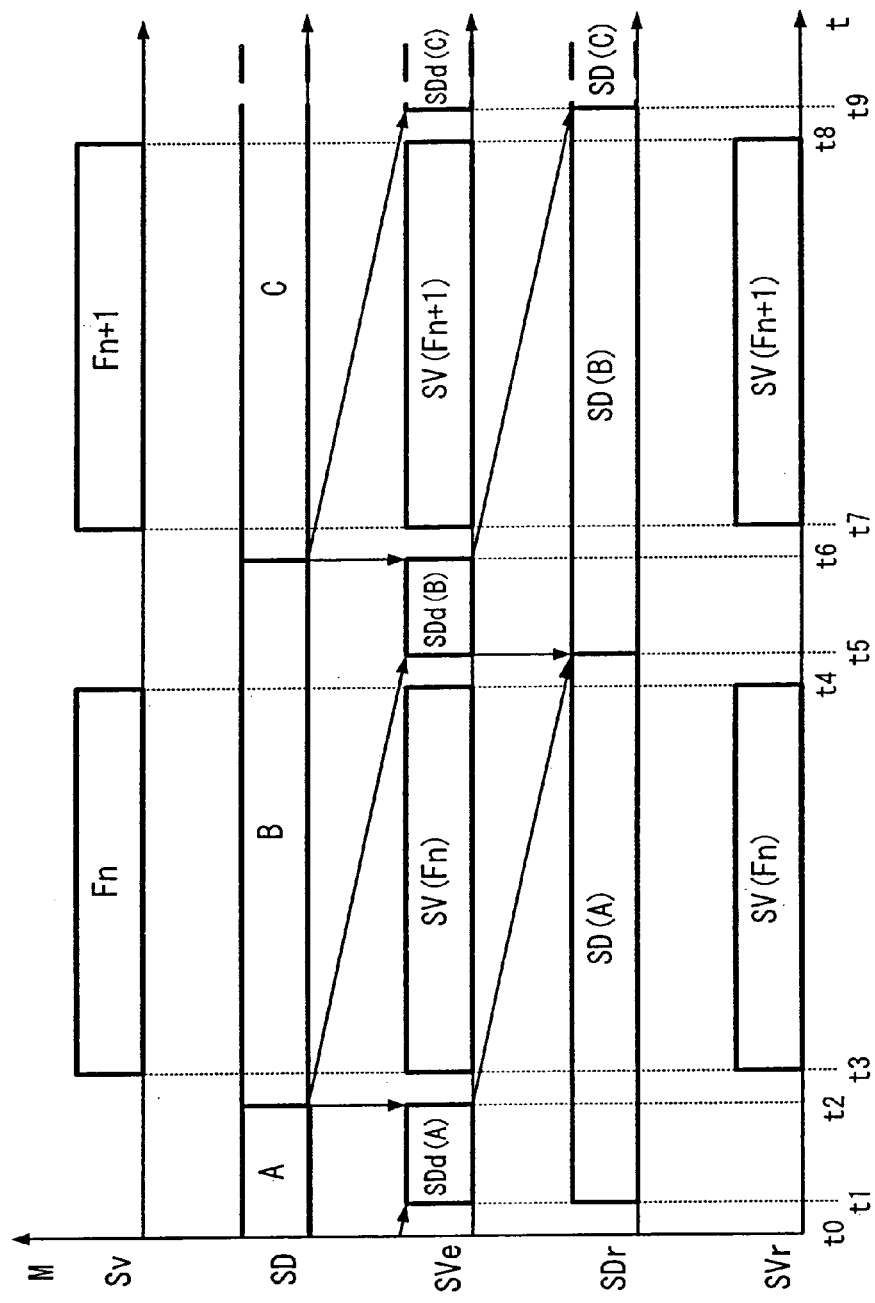
FIG. 3 is a timing chart showing a state observed in a DVI transmitter and a DVI receiver illustrated in FIG. 1 of how various signals are processed.

With reference to a timing chart illustrated in FIG. 3, the operation of transmitting and receiving the DVI signal in the above-described DVI transmitter 103 and DVI receiver 104 is described next in more detail. In FIG. 3, a vertical axis schematically represents intensities of the video signal SV, the data signal SD, the DVI video signal SVe, the reproduced data signal SDr, and the reproduced video signal SVr, and a horizontal axis represents time (that is, timing). Note that, in the present example, the video signal SV supplied to the DVI transmitter 103 carries an n-th (n is an arbitrary natural number) frame image Fn between time t2 to time t4 and an n+1-th frame image Fn+1 between time t7 and time t8. A period between time t5 and time t6 is a vertical blanking period VBP between the frame image Fn and the frame image Fn+1.

The data signal SD carries information A between time t0 and time t2 and information B between time t2 and time t6, and starts carrying information C at time t6. In FIG. 3, for easy understanding of a relationship among signal processing timings, components corresponding to the information A, the information B, and the information C of the data signal SD are represented as SD(A), SD(B), SD(C) as well as SDd(A), SDd(B), and SDd(C), respectively. Also, components corresponding to the frame image Fn and the frame image Fn+1 of the video signal SV are represented as SV(Fn) and SV(Fn+1), respectively.

The operation of the DVI transmitter 103 is now described by taking a process on such input signals (the video signal SV and the data signal SD) after time t2 as an example. First, at time t2, the controller 103_1 controls the memory 103_2 by the first control signal SEN1 for starting a process of storing the data signal SD of the information B. Then, with the first control signal SEN1, the controller 103_1 causes the memory 103_2 to output the stored data signal SDd (SD(B)) between time t5 and time t6 at the latest. Furthermore, the controller 103_1 produces a second control signal SEN2 for causing the multiplexer 103_3 to output the multiplexed red signal SRd (SD(B)) to the TMDS encoder 103_5r.

Similarly, with the first control signal SEN1, the controller 103_1 causes the memory 103_2 to start a process of storing the data signal SD of the information C, and causes the multiplexer 103_3 to output the stored data signal SDd (SD(C)) between time t9 and time t10 (not shown) at the latest. Furthermore, with the second control signal SEN2, the controller 103_1 causes the multiplexer 103_3 to output the multiplexed red signal SRd (SD(C)) between time t9 and time t10.

As described above, the video signal SV (the multiplexed blue signal SBs, the green signal SG, and the multiplexed red signal SRd) obtained by multiplexing the data signal on either one of the blue signal SB, the green signal SG, and the red signal SR is encoded by the TMDS encoder group 103_5 for transmission as the DVI video signal SVe to the DVI receiver 104. As also described above, the DVI video signal SVe and the system clock CLK together form the DVI signal Sdvi.

That is, in the present example, the data signal SD supplied by the external content data source is first stored in the memory 103_2. Then, the stored data signal SD is output as the stored data signal SDd to the multiplexer 103_3 during the vertical blanking period VBP of the video signal SV (time 5 to time t6/time t9 to time 10), and is then multiplexed with the red signal SR, which is part of the video signal SV, for output as the multiplexed red signal SRd to the TMDS encoder 103_5r.

Note that the video signal SV having the stored data SDd multiplexed therewith is not restricted to the red signal SR, and can be the blue signal SB or the green signal SG. Also, the period during which the stored data signal SDd is multiplexed with the video signal SV is not restricted to the vertical blanking period VBP, and can be a horizontal blanking period HBP.

A process at the DVI receiver 104 after time t2 is now described in detail. Note that not a large amount of but some time has elapsed while the DVI receiver 104 is performing various processes on the received DVI signal Sdvi generated by the DVI transmitter 103 processing the video signal SV. Therefore, strictly speaking, the times illustrated in FIG. 3 associated with the video signal SV, the data signal SD, and the DVI video signal SVe in the DVI transmitter 103 are different from those associated with the reproduced data signal SDr and the reproduced video signal SVr in the DVI receiver 104. The differences, however, are subtle and negligible as long as the transmitter and the receiver have a predetermined relationship as to the timing of each process. For this reason, descriptions are made in the specification by assuming that each time illustrated in FIG. 3 represents a correspondence in timing of each process in the DVI transmitter 103 and the DVI receiver 104.

At time t2, a process started at time t1 by the TMDS decoder 104_5r for expanding the stored data signal SDd(A) contained in the DVI video signal SVe (red DVI signal SRe) still continues.

Then, at time t3, a process is started by the TMDS decoder group 104_5 for decoding the blue DVI signal SBe, the green DVI signal SGe, and the red DVI signal SRe. With this, the reproduced blue signal SBr, the reproduced green signal SGr, and the reproduced red signal SRr are generated, and a process of outputting the reproduced video signal SVr (SV(Fn)) is started.

At time t4, the process of expanding the stored data signal SDd(A) still continues, while a process of outputting the reproduced video signal SVr (SV(Fn)) is completed.

At time t5, the process of expanding the stored data signal SDd (A) is completed, while a process of expanding the stored data signal SDd(B) is started.

At time t6, the process of expanding the stored data signal SDb (B) started at time t5 still continues. As for the data signal SD, a process performed by the TMDS decoder 104_5r for expanding the stored data signal SDd(B) contained in the SVl video signal SVe (red DVI signal SRe) still continues.

At time t7, a process of outputting the reproduced video signal SVr (SV(Fn+1)) is started, and is completed at time t8.

Then, at time t9, the process of expanding the stored data signal SDd(B) is completed, and a process of expanding the stored data signal SDd(C) is started.

As described above, the video signal SV (the multiplexed blue signal SBs, the green signal SG, and the multiplexed red signal SRd) obtained by multiplexing the data signal on either one of the blue signal SB, the green signal SG, and the red signal SR is encoded by the TMDS encoder group 103_5 for transmission as the DVI video signal SVe to the DVI receiver 104.

That is, in the present example, of the DVI signal Sdvi transmitted from the DVI transmitter 103, the DVI video signal SVe (the TMDS-encoded blue DVI signal SBe, green DVI signal SGe, and red DVI signal SRe) is decoded by the TMDS decoder group 104_5. Then, the stored data signal (data signal SD) inserted in the vertical blanking period VBP (horizontal blanking period HBP) of the DVI video signal SVe is demultiplexed and extended. Then, the reproduced stored data signal SDdr is expanded and stored in the memory 104_2 for recovering the original data signal SD.

As described above, in the present invention, the input transport stream data (TS) is demultiplexed by the transport decoder 1001 into video data (MPEG content data SC) and a data signal (data signal SD). The demultiplexed video data (MPEG content data SC) is decoded by the MPEG decoder 102 for generating the video signal SV. The video signal (SV) and the demultiplexed data signal (SD), such as closed captions or teletext, are supplied to the DVI transmitter 103. With the supplied signals (SV, SD), the data signal (SD) is multiplexed by the TMDS encoder group 103_5 during the vertical blanking period VBP of the video signal (SV).

Figure 4:
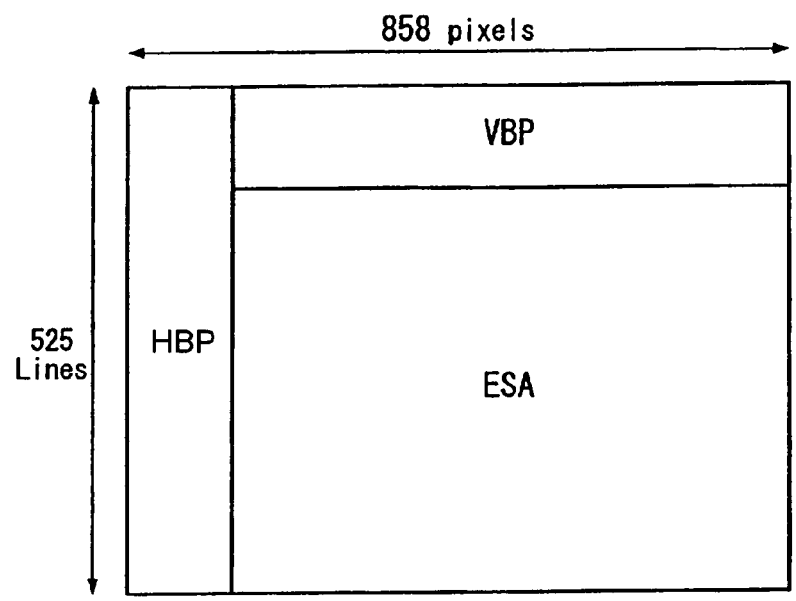
FIG. 4 is a schematic illustration showing positions where a data signal is multiplexed on a video signal by a multiplexer illustrated in FIG. 1.

FIG. 4 illustrates one example in which the data signal SD is multiplexed with the video signal SV, which is a 480P signal (progressive video). In FIG. 4, one frame image of the 480P video signal SV is schematically illustrated. A left end portion of the frame represents the horizontal blanking period HBP, an upper end portion thereof represents the vertical blanking period VBP, and the remaining portion represents an effective screen ESA. In the present example, the data signal SD is multiplexed during the vertical blanking period VBP represented by the upper end portion. As has been described already, the data signal SD may be multiplexed during the horizontal blanking period HBP instead of the vertical blanking period VBP.

Furthermore, the data signal SD may be multiplexed during both the vertical blanking period VBP and the horizontal blanking period HBP. Still further, the data signal SD may be multiplexed with at least one signal line other than those during the vertical horizontal blanking period VBP or the horizontal blanking period HBP, such as one or all of RGB signal lines.

The video signal components (SRd, SBe) having the data signal (SD) and the synchronizing signal multiplexed therewith are converted by the TMDS encoding section (103_5) together with unmultiplxed video signal components (SG) into the TMDS signals (SRe, SBe, SGe).

The converted TMDS signals (SRe, SBe, SGe) are supplied via the data line (114) to the TMDS decoding section (104_5) of the DVI receiver (104) for decoding. Then, the signals are demultiplexed into the video signals (SRr, SBr, SGr), the data signal (SDdr), and the synchronizing signals (H-Sync, V-Sync).

The demultiplexed video signals SVr (SBr, SRr, SGr) are supplied to the video signal processor 105 for processing, such as format conversion and image quality correction. Also, the data signal (SD) is decoded by, for example, a CPU of the data decoder 106 into the content video signal (Si). The content video signal (Si) is combined with the display data (D) by the combiner 107, and a combined image is displayed on the display unit 108.

Figure 5:
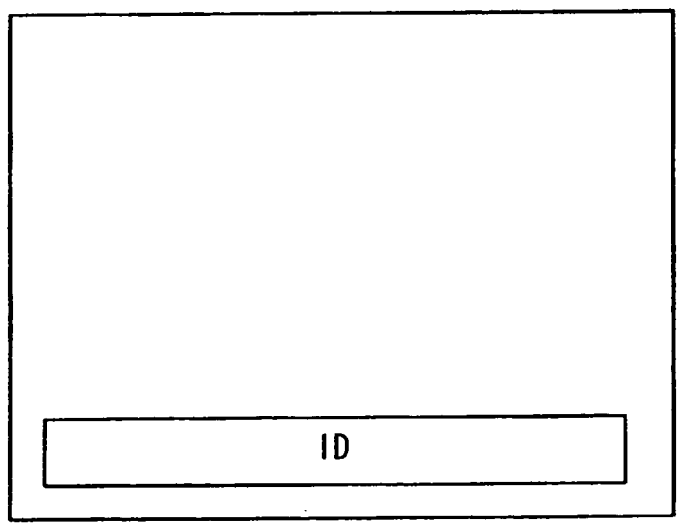
FIG. 5 is a schematic illustration showing one example of a screen displayed on a display device illustrated in FIG. 1.

FIG. 5 illustrates one example of a combined image displayed on a screen of the display unit 108. In the drawing, an image ID of display data D, such as closed captions, combined with the content video signal Si is shown on the lower portion of the screen. In the present invention, the video device 100 may decode analog signals, or may handle a DV format such as DVC.

Second Embodiment

Figure 6:
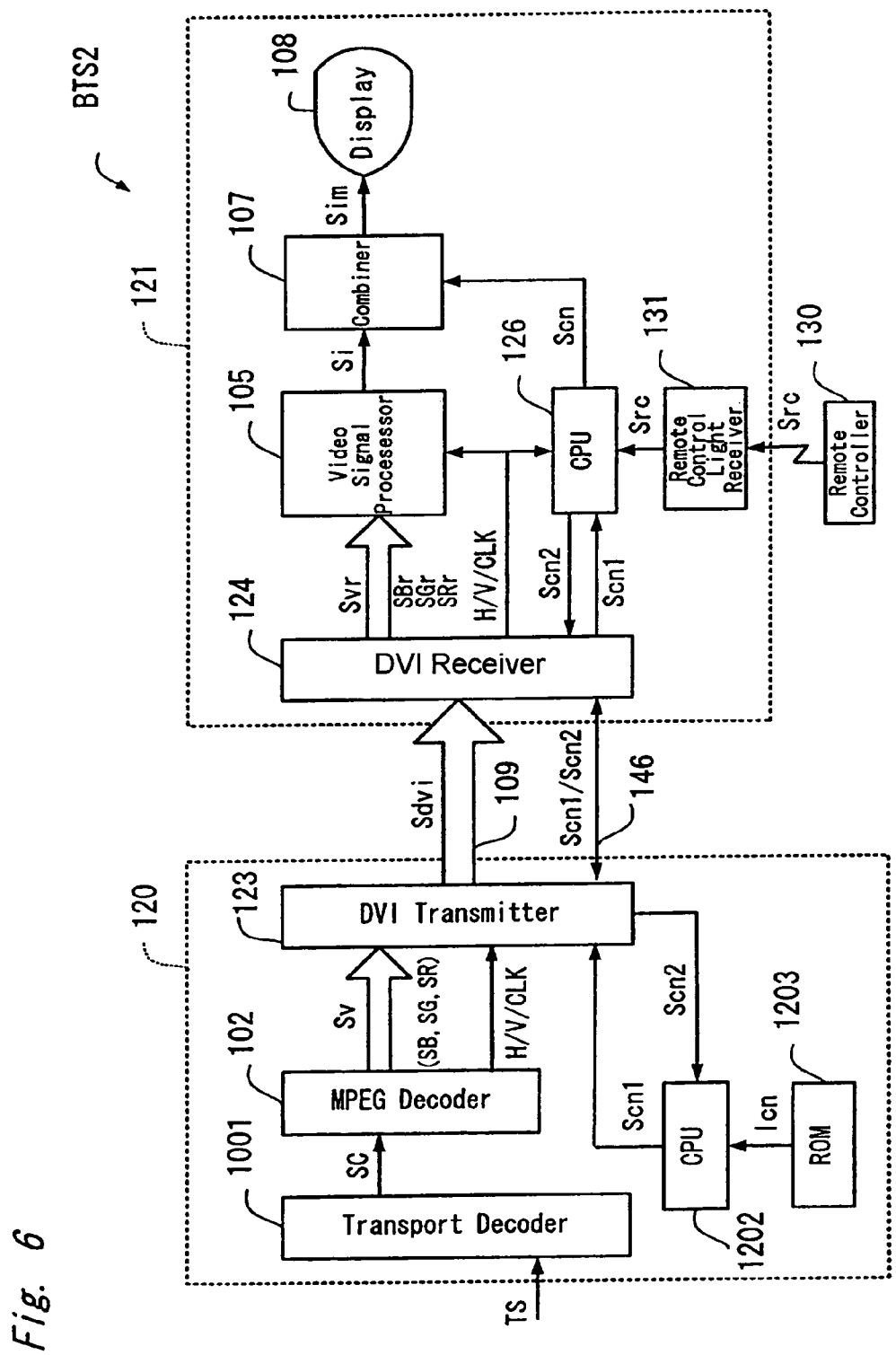
FIG. 6 is a block diagram illustrating the configuration of a baseband video transmission system according to a second embodiment of the present invention.
Figure 7:
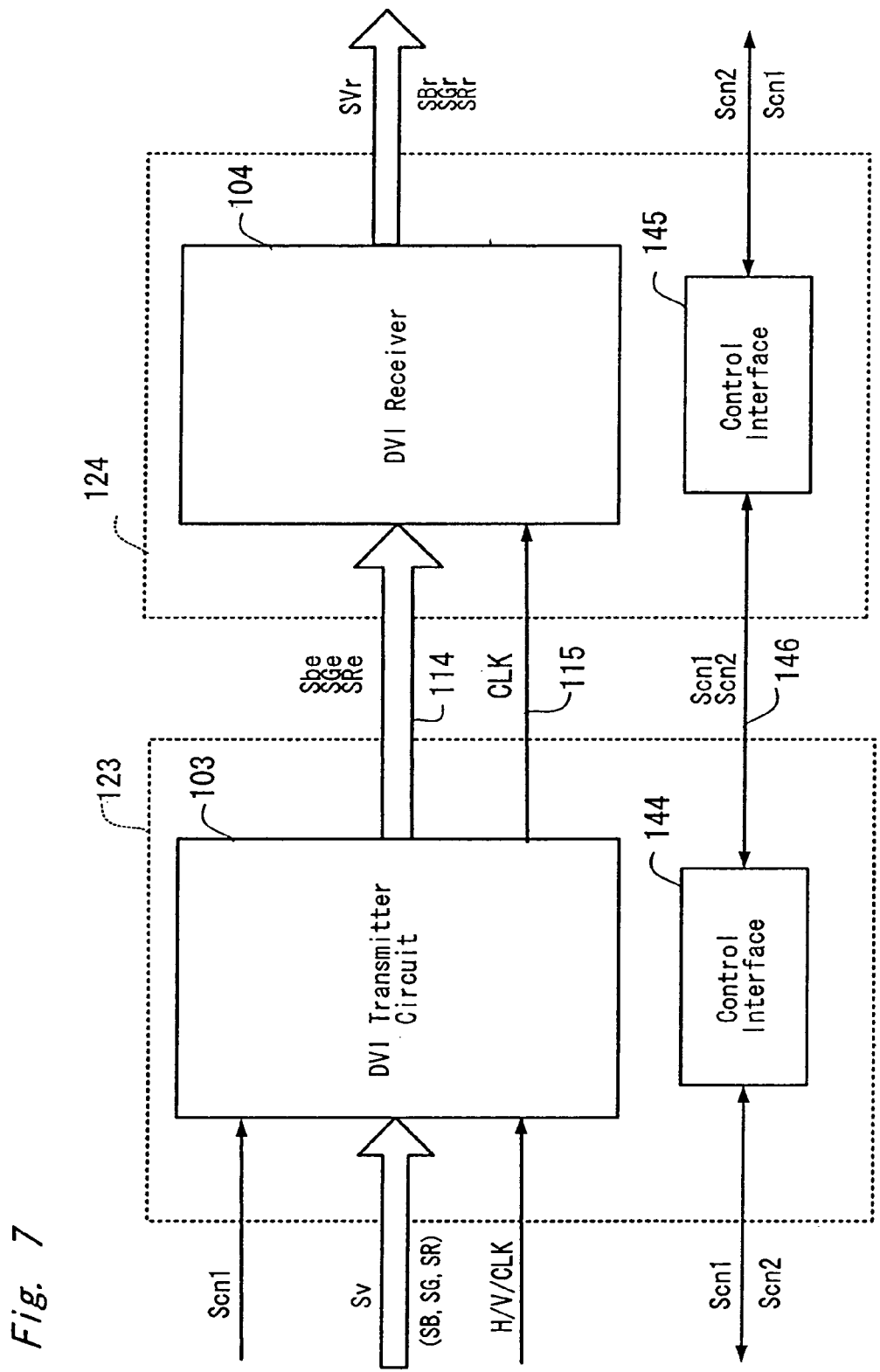
FIG. 7 is a block diagram illustrating the structure of a DVI receiving device and a DVI transmitting device illustrated in FIG. 6.

With reference to FIGS. 6 and 7, a baseband video transmission system according to a second embodiment of the present invention is described.

As illustrated in FIG. 6, a baseband video transmission system BTS2 according to the present embodiment is constructed by adding new functional components to the baseband video transmission system BTS1 of the first embodiment or by replacing some of the components thereof. Specifically, a video device 120 in the baseband video transmission system BTS2 is constructed by adding a CPU 1202 and a ROM 1203 to the video device 100 of the first embodiment and by replacing the DVI transmitter 103 with a DVI transmitting device 123. The ROM 1203 stores device control information such as AV commands based on the IEEE 1394 standard. The CPU 1202 is connected to the ROM 1203 and the DVI transmitting device 123 for controlling the DVI transmitting device 123 based on device control information Icn stored in the ROM 1203.

That is, based on the device control information Icn supplied by the ROM 1203, the CPU 1202 outputs a first control signal Scn1 for controlling the operation of the DVI transmitting device 123 to the DVI transmitting device 123. That is, in the present embodiment, the first control signal Scn1 is supplied to the DVI receiving device 124 instead of the data signal SD in the first embodiment. Furthermore, as will be described in further detail below, the CPU 1202 is supplied by the DVI receiving device 124 with a second control signal Scn2 transmitted from a display 121 via a signal line 146.

Still further, the display 121 is constructed by replacing the data decoder 106 of the display 101 of the first embodiment with a CPU 126 and a remote controller light receiver 131 for receiving a remote control wave from an external remote controller 130, and by replacing the DVI receiver 104 with the DVI receiving device 124.

FIG. 7 illustrates the structure of the DVI transmitting device 123 and the DVI receiving device 124. The DVI transmitting device 123 is constructed by newly providing a first control interface 144 to the DVI transmitter 103 illustrated in FIG. 2. Similarly, the DVI receiving device 124 is constructed by newly providing a second control interface 145 to the DVI receiver 104. The first control interface 144 and the second control interface 145 are connected to each other via the signal line 146 for exchanging the first control signal Scn1 and the second control signal Scn2 between each other.

Hereinafter, the structure and operation common to the baseband video transmission system BTS1 are not described, and features which are unique to the baseband video transmission system BTS2 are mainly described. The device control information Icn, such as AV commands, based on the IEEE 1394 standard and stored in the ROM 1203 are supplied as the first control signal Scn1 to a DVI transmitter 103 of the DVI transmitting device 123 via the CPU 1202. The supplied device control information Icn is multiplexed during a vertical blanking period VBP of a video signal (red signal SR) by the multiplexer 103_3 or the multiplexer 103_4.

The multiplexed red signal SRd having the device control information Icn multiplexed therewith is converted by the TMDS encoder group 103_5 into TMDS signals (a blue DVI signal SBe, a green DVI signal SGe, and a red DVI signal SRe), and these signals are output via the data line 114 to the TMDS decoder group 104_5 of the DVI receiving device 124 (DVI receiver 104) for decoding. Then, these signals are demultiplexed into video signals, a data signal, and synchronizing signals. The demultiplexed video signals are supplied to the video signal processor 105 for processing, such as format conversion and image quality correction. The device control information Icn is decoded and converted by the CPU 126 into video signals, and is then combined with the video signals for presentation on the display unit 108 as an on-screen message OSM.

Figure 8:
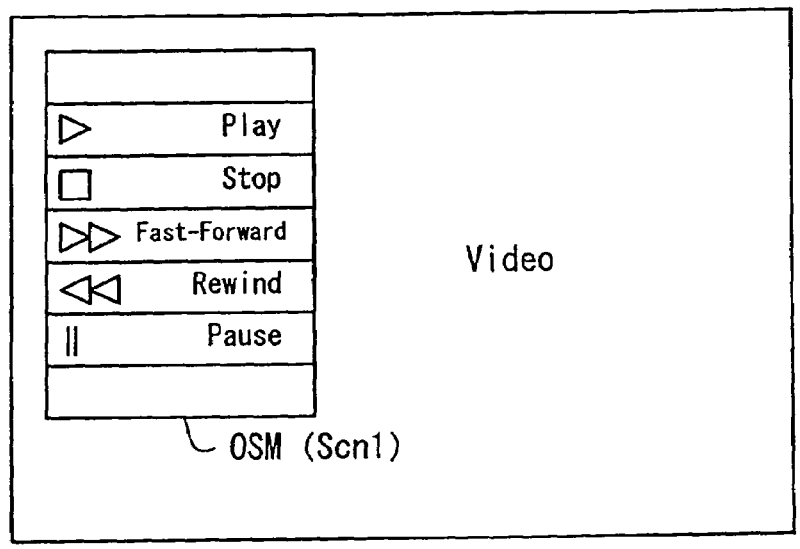
FIG. 8 is a schematic illustration showing one example of a screen displayed on a display device illustrated in FIG. 6.

FIG. 8 illustrates one example of the on-screen message OSM presented on the display unit 108. Upon viewing this on-screen message OSM, a user selects a command by utilizing the remote controller 130. Then, a remote controller signal Src corresponding to the user's selection is issued from the remote controller 130. The remote controller signal Src is received by the remote controller light receiver 131, and is then further forwarded by the CPU 126 as the second control signal Scn2 to the DVI receiving device 124 (DVI receiver 104). The second control signal Scn 2 is further forwarded via the second control interface 145 to the DVI transmitting device 123, is received by the first control interface 144, and then is forwarded to the CPU 1202 for performing control over the device.

Figure 9:
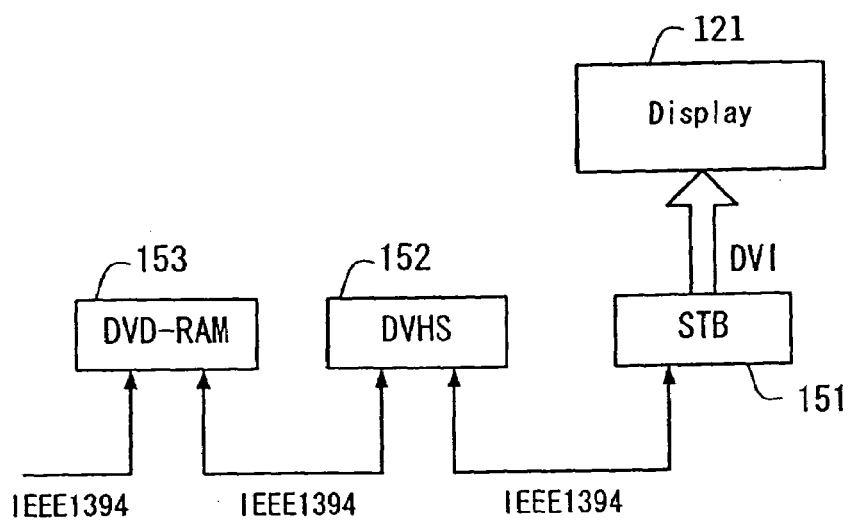
FIG. 9 is a schematic illustration showing one exemplary case where AV devices are connected to a display illustrated in FIG. 6 based on the IEEE 1394 standard.
Figure 10:
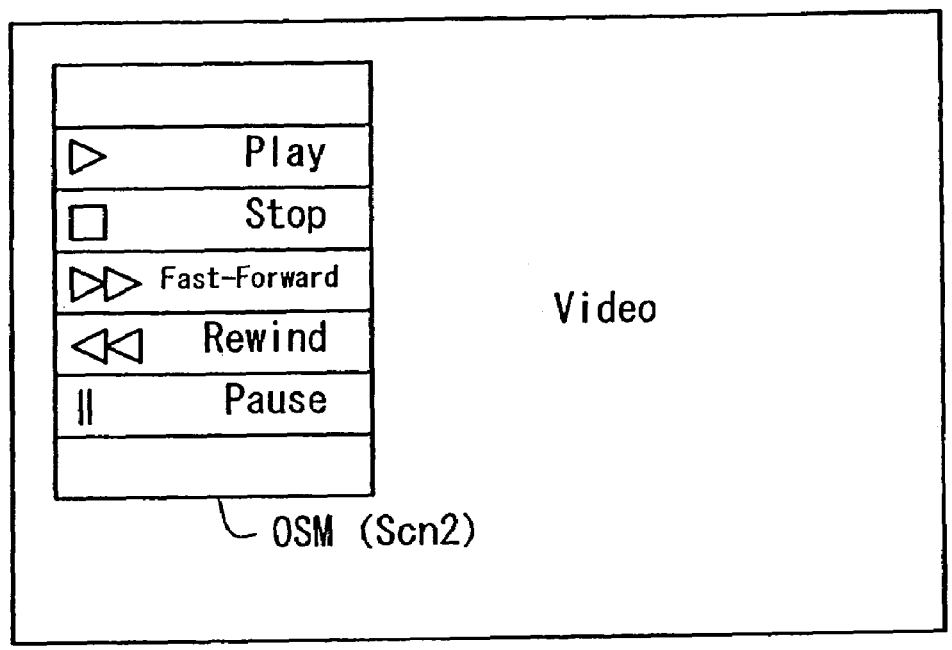
FIG. 10 is a schematic illustration showing another example of the screen displayed on the display device illustrated in FIG. 6, which is different from the example illustrated in FIG. 8.
Figure 11:
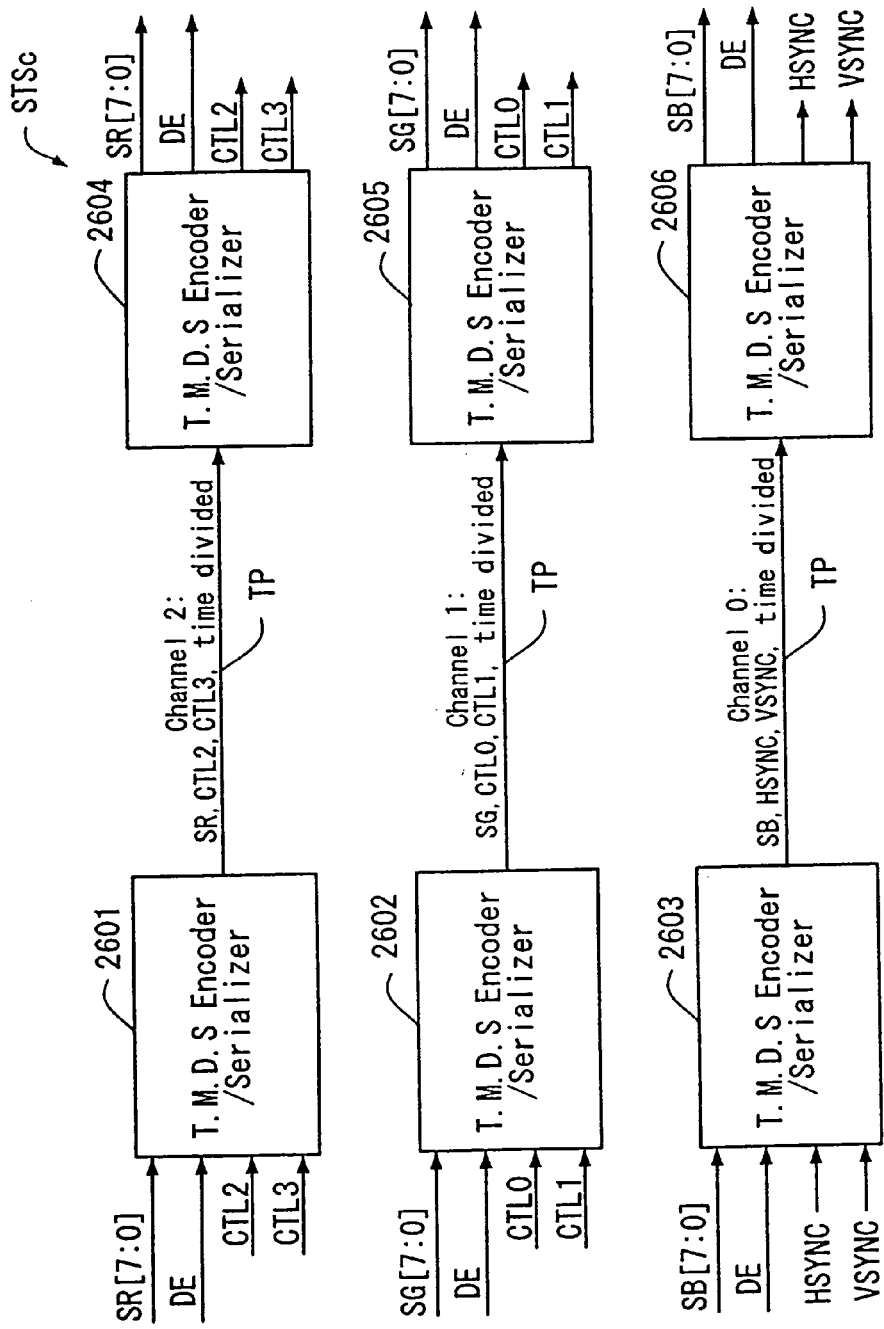
FIG. 11 is a block diagram illustrating the structure of a conventional signal transmission system.

Also, when devices as illustrated in FIG. 9 are connected to the display 121 based on the IEEE 1394 standard, a set-top box (STB) 151 reads AV commands issued from a DVHS 152, DVD-RAM 153, etc., connected in compliance with the IEEE 1394 standard, and control information of these AV devices that is decoded by the set-top box 151 is forwarded to the display 121. With this, not only the devices connected via the DVI but also other devices can be controlled from the display 121. In the example illustrated in FIG. 9, the DVHS 152 connected in compliance with the IEEE 1394 standard can be controlled with the display 121.

As described above, according to the present invention, a signal transmission system in which a video signal is time-division-multiplexed with a data signal and device control signal can achieve the combining of closed captions or teletext with DVI connection. Also, it is possible to control a device connected to a display or another device connected to that device based on the IEEE 1394 standard, for example, thereby providing an excellent user interface.

INDUSTRIAL APPLICABILITY

As described in the foregoing, the present invention can be used for any AV device using a signal transmission system complying with the DVI standard. Furthermore, the present invention can be used for an AV device for controlling a host from a client.

The invention claimed is:

1. A baseband video transmission system for transmission of a video signal including component video signals, said system comprising:
   a transmitting device for
      multiplexing a horizontal synchronizing signal and a vertical synchronizing signal with at least one component video signal of the video signal,
      multiplexing a data signal with at least one other component video signal of the video signal during at least one blanking period of the component video signals of the video signal,
      multiplexing each component video signal, including the at least one component video signal having the horizontal synchronizing signal and the vertical synchronizing signal multiplexed therewith and the at least one other component video signal having the data signal multiplexed therewith, with each other to generate a DVI video signal, and
      outputting a DVI signal including the DVI video signal and a system clock of the component video signals; and
   a receiving device for
      receiving the DVI signal,
      extracting the horizontal synchronizing signal and the vertical synchronizing signal from the at least one composite video signal having the horizontal synchronizing signal and the vertical synchronizing signal multiplexed therewith included in the received DVI signal,
      extracting the data signal from the at least one other component video signal having the data signal multiplexed therewith included in the received DVI signal,
      extracting each component video signal of the video signal from the received DVI signal,
      using the extracted horizontal synchronizing signal, the extracted vertical synchronizing signal and the received system clock of the component video signals to synchronize a character image signal from the extracted data signal with the video signal, and
      reproducing the video signal and the character image signal,
   wherein the data signal represents data of a type selected from the group consisting of closed-captions, teletext, and a control signal for controlling a host.

2. The baseband video transmission system according to claim 1, wherein the data signal is indicative of character information typified by closed captions and teletext.

3. The baseband video transmission system according to claim 1, wherein said transmitting device includes:
   demultiplexing means for demultiplexing the video signal into the component video signals;
   first multiplexing means for multiplexing the horizontal synchronizing signal and the vertical synchronizing signal with the at least one component video signal of the video signal, and multiplexing the data signal with the at least one other component video signal of the video signal during at least one blanking period of the component video signals of the video signal;

encoding means for TDMS-encoding each component video signal; and second multiplexing means for multiplexing each encoded component video signal to generate the DVI video signal.

4. The baseband video transmission system according to claim 3, wherein said receiving device includes:

TMDS-decoding means for TDMS-decoding the DVI video signal to separately reproduce the component video signals, the data signal and the horizontal and vertical synchronizing signals; and expanding means for expanding the reproduced character image signal.

5. The baseband video transmission system according to claim 4, wherein said receiving device includes:

video signal processing means for reproducing the video signal from the reproduced component video signals in accordance with the horizontal and vertical synchronizing signals including the received system clock of the component video signals;

data decoder means for generating the character image signal from the expanded data signal in accordance with the synchronizing signals; and image combining means for multiplexing the character image signal with the reproduced video signal.

6. The baseband video transmission system according to claim 1, wherein the data signal is indicative of control information that enables said receiving device to operate said transmitting device.

7. The baseband video transmission system according to claim 6, wherein said receiving device is operable to also operate a host device connected to said receiving device based on the IEEE 1394 standard.

8. The baseband video transmission system according to claim 1, wherein the data signal is indicative of a command supplied by a remote controller.

9. The baseband video transmission system according to claim 1, wherein said transmitting device includes:

a demultiplexing unit for demultiplexing the video signal into the component video signals;

a first multiplexing unit for multiplexing the horizontal synchronizing signal and the vertical synchronizing signal with the at least one component video signal of the video signal, and multiplexing the data signal with the at least one other component video signal of the video signal during at least one blanking period of the component video signals;

an encoding unit for TMDS-encoding each component video signal; and a second multiplexing unit for multiplexing each encoded component video signal to generate the DVI signal.

10. The baseband video transmission system according to claim 9, wherein said receiving device includes:

a TMDS-decoding unit for TMDS-decoding the DVI video signal to separately reproduce the component video signals, the data signal and the horizontal and vertical synchronizing signals; and an expanding unit for expanding the reproduced character image signal.

11. The baseband video transmission system according to claim 10, wherein said receiving device includes:

a video signal processing unit for reproducing the video signal from the reproduced component video signals in accordance with the horizontal and vertical synchronizing signals including the received system clock of the component video signals;

a data decoding unit for generating the character image signal from the expanded data signal in accordance with the horizontal and vertical synchronizing signals and the system clock; and an image combining unit for multiplexing the character image signal with the reproduced video signal.

* * * * *